United States Patent [19]

Streichenberger

[11] Patent Number: 4,854,774

[45] Date of Patent: Aug. 8, 1989

[54] PROCESS FOR IMPLANTATION OF AQUATIC ARTIFICIAL SUBSTRATES, STRUCTURES FOR THE IMPLANTATION, AND DEVICE FOR OPERATING THE PROCESS

[76] Inventor: Antonius Streichenberger, St Pourcain sur Besbre, 03290 Allier, France

[21] Appl. No.: 23,188

[22] Filed: Mar. 9, 1987

[30] Foreign Application Priority Data

Mar. 28, 1986 [FR] France .................. 86 04732

[51] Int. Cl.⁴ .................. E02B 3/00; A01K 61/00
[52] U.S. Cl. .................. 405/25; 119/3; 119/4; 405/21; 405/24
[58] Field of Search .................. 405/24, 23, 21, 25; 119/3, 4

[56] References Cited

U.S. PATENT DOCUMENTS

| | | |
|---|---|---|
| 3,299,640 | 1/1967 | Nielsen . |
| 3,300,987 | 1/1967 | Maeda .................. 405/50 |
| 3,323,310 | 6/1967 | Arpin . |
| 3,455,278 | 7/1969 | Hunt . |
| 3,540,415 | 11/1970 | Bromley .................. 119/3 |
| 3,648,464 | 3/1972 | Edwards .................. 405/24 |
| 3,691,994 | 9/1972 | McPherson . |
| 3,881,319 | 5/1975 | Katagiri .................. 405/50 |
| 4,344,384 | 8/1982 | Rowley .................. 119/4 |
| 4,348,983 | 9/1982 | Cooper .................. 119/4 |
| 4,428,699 | 1/1984 | Juhola .................. 405/50 |
| 4,490,071 | 12/1984 | Morrisroe .................. 405/24 |
| 4,508,057 | 4/1985 | Suzuki .................. 119/3 |

FOREIGN PATENT DOCUMENTS

| | | |
|---|---|---|
| 738639 | 10/1932 | France . |
| 2195396 | 3/1974 | France . |
| 2376623 | 8/1978 | France . |
| 2376916 | 8/1978 | France . |
| 3466192 | 4/1981 | France . |
| 1191614 | 5/1970 | United Kingdom . |

OTHER PUBLICATIONS

Ercon Systems, Inc. brochure "Erosion Control—There is a Solution", two pages, Date unknown.

Primary Examiner—Dennis L. Taylor
Attorney, Agent, or Firm—Lyon & Lyon

[57] ABSTRACT

Immersing, excavating, and mooring means for implantation of aquacultural artificial substrates on sedimentary bottoms.

The artificial substrate structure is a single unit which comprises a support-surface and a mooring organ provided with anti-extraction devices. It assures the triple function of fixing, positioning and mooring vegetal and animal aquatic cultures in a natural environment and particularly in open sea. Excavation of the sea floor's bottom is processed by means of pressurized air or water currents.

11 Claims, 2 Drawing Sheets

PROCESS FOR IMPLANTATION OF AQUATIC ARTIFICIAL SUBSTRATES, STRUCTURES FOR THE IMPLANTATION, AND DEVICE FOR OPERATING THE PROCESS

BACKGROUND

1. Field of Invention

The present invention concerns an aquatic artificial substrate implantation process; also it concerns the structures intended for this implantation and the device for operating the process.

Aquaculture in a natural environment and more particularly the open sea aquaculture, faces important difficulties protecting immersed installations from water movement and other phenomena such as current, storm, concretion, fouling, which in a little time ruin the best of devices.

2. DESCRIPTION OF PRIOR ART

It has been attempted to assure the protection of these installations by means of artificial substrates, as described for example in the demand PCT FR 85/00285 from the applicant. These artificial substrates are built with appropriate devices among which one differentiates three kind of material for three different functions. A first category of material is employed for fixation of the cultivated species; this function is carried on by ropes, nets, bars, tubes, surfaces, and others. A second category of material is employed for positioning the ensembles at a fixed level in relation to the water bottom; this function is assured by buoys, floats and others. Last of all a third category of material is employed for fastening the seal floor; this function is assured by moorings, anchors, posts and others.

OBJECTS AND ADVANTAGES

The invention's purpose is to assemble in a single unit the different categories of material which are presently used while keeping the essential functions.

The invention consists in an implantation process, by means of an appropriate device, of new structures which fulfil the triple function of fixing, positioning and mooring an artificial substrate which is directly intended for aquacultural installations and others.

The process of implantation of aquatic artificial substrates according to the invention, consists at the first phase in fixing algae through sowing on a support joined to a mooring organ, at the second phase in immersing the structure composed of the mooring organ and support, subsequently it consists in burying the mooring organ into the aquatic bottom while placing the support above the sediments layer, at a predetermined level.

According to a preferential disposition of the invention, the process consists in excavating forward of the mooring organ, in order to set it automatically into the sediments layer.

According to another disposition of the invention the process consists, after the structure setting, to do a sowing of the said structure by means of portuguese oyster type shellfishes, so as to turn an unstable sediment-constituted sea floor into a stable sea floor.

Also the invention concerns the structure which allows the implantation of aquatic artificial substrates, including notably algae fixed on a support by means of sowing, said support being joined with a mooring organ; according to the invention the mooring organ is constituted by a thin and lengthy element intended to be buried in the sediments layer of the aquatic floor, so as to place the algae support above the said floor.

According to a first disposition of the invention the lengthy element is a pipe provided with asperities and/or anti-extraction shapes.

According a second disposition of the invention the lengthened element is in the shape of a pipe which includes a rope the extremity of which bears an antiextraction device.

Also, according to the invention, the structure support is a flat surface; it can include radial branches which offer complementary fixing possibilities for algae previously attached to the surface, allowing an expansion in the width and at the same time in the height.

Also the invention concerns a device for operating the aquatic artificial substrate implantation process; this device includes means of immersion of the structure to be implanted, and means for excavating the aquatic floor allowing the simultaneous setting of the mooring organ.

According to a preferential disposition of the invention, the excavating means are constituted by a tube conveying pressurized fluid which is extended, below the support-surface, in an excavating pipe parallel to the mooring organ, down to its extremity.

According to a first disposition of the invention, the excavating pipe constitutes at the same time a mobile bell for the immersion and setting of the structure.

According to a second disposition of the invention, the pipe conveying the pressurized fluid is placed in a parallel direction to the mooring organ, and is disjoined from the structure when excavating is completed.

The invention will be better understood with the help of the following drawings and descriptions given as an indication.

DRAWING FIGURES

DESCRIPTION

Figure 1:
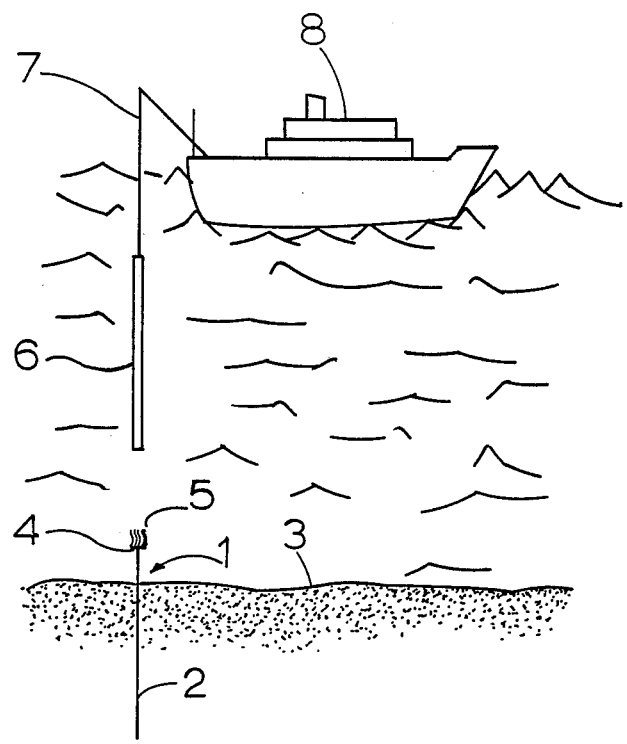
FIG. 1 shows the setting means of a structure according to the invention and said structure set in the sediments layer

In FIG. 1 is shown a structure 1, according to the invention, constituted by a mooring organ 2, of which a part is buried in the sediments layer of the bottom 3, and of which the other part is elevated above this bottom; the mooring organ 2 supports at its top a horizontal surface 4 on which small cultured algae 5 are fixed. Above this structure, we see an excavating device 6 hanging on a cable 7; the structure and the apparatus and devices necessary to its immersing and burying, can be operated from a boat 8 from which they are handled and sent down to the ocean floor, at the cable's end and by gravity effect only.

In any case, the structure and the organisms which are implanted at its top are immersed, positioned, and moored in the waters in a single and same operation.

Figure 2:
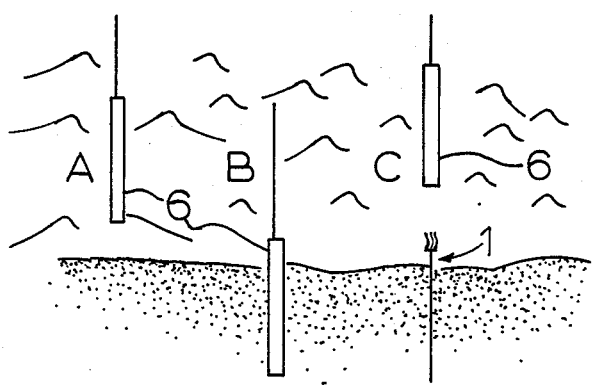
FIG. 2 illustrates implanting operations of a structure in the sediments layer in three phases A, B, C.

In FIG. 2 have been schematized the three phases of the setting of the structure. In A, we see the immersing, in B the burying, and in C the buried structure and the setting device after separation.

The burying operation of structure 1 according to the invention is, in any case, performed through air or water current's action in compression, conveyed by tubes, and which through repulsion of the bottom sediments, digs under the structure a hole in which by gravity the structure buries itself.

When the wanted excavating depth is reached, phase B, the device which conveys the pressurized air and/or water used in excavating, separates from structure 1 subsequently its extraction from the sedimentary mass wherein it is buried with said structure. Structure 1 finally remains buried and moored in the sediments.

The structure's adhesion within the sedimentary mass can be advantageously increased by some protrusions provided along this structure. These protrusions can be pot-hanger notches or holes or all shapes or devices so oriented that they weakly oppose the entering of structures into the sediments but they strongly oppose their withdrawing out of the sediments.

Figure 3:
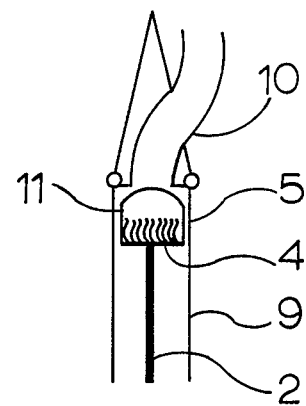
FIG. 3 shows a first way of making a structure for implantation, and its setting device.
Figure 3A:
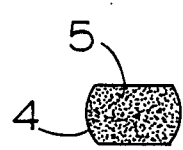
FIG. 3a shows the support-surface viewed from above.

In FIG. 3, we see the upper part of a structure, of which the mooring organ 2 is surrounded with a support-surface 4 for fixation of cultivated young algae 5. This structure is placed inside an excavating pipe 9 connected with a pressurized air or water conveying tube 10. Inside the excavating pipe 9, of which the section can be 10 centimeters wide for example, a bell 11 mobile in the pipe and which covers the cultures placed on the support-surface 4, protects the cultured organisms from the air and water currents flowing in the pipe 9. In FIG. 3a, we see viewed from above, the projected shape of support-surface 4 and bell 11. This shape which is not round as the excavating tube 9, does not fill all the pipe's section in order to let pass air and water currents inside the pipe 9.

Figure 4:
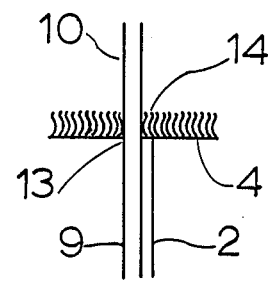
FIG. 4 shows a second way of making a structure for implantation, and its setting device

In FIG. 4, we see the upper part of the structure of which the mooring organ 2 is a solid bar surmounted by the support-surface 4 for fixation of the cultivated organisms 5. The support-surface 4 includes an orifice 13 making a way for the compressed air or water conveying tube 10; the said tube is extended under the support-surface 4 along the mooring organ 2, forming the excavating pipe 9. The structure 1 is carried along into the sediments by the excavating pipe 9 which press hard on the support-surface due to the stop 14. The excavating pipe weight can be adjusted as needed. The excavating pipe 9 is attached to the mooring organ 2 by a simple bond which after excavating will be broken by pullback strength of the hanging cable which pull up said excavating pipe.

Along the mooring organ 2, one, two or several excavating pipes 9 can be put together.

Several excavating tubes 9 can be arranged as in a bundle around the mooring organ 2. These excavating pipes 9 can also form around the mooring organ 2 a continuous jacket, unfigured, of which the circumference is at a point opened by a slash through which goes a rigid shaft 15 joining the mooring organ 2 and the fixation support-surface 4 which forms a circle around the excavating tubes. So the jacket formed around the mooring organ 2 by the tubes' unit 9 will freely slide along the said mooring organ; the slash from top to bottom in the jacket allowing the binding shaft between the mooring organ and its support-surface to pass.

Figure 4A:
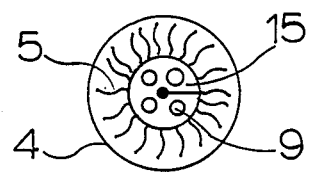
FIG. 4a is a plan view of FIG. 4.

In FIG. 4a, we see viewed from above, a unit of excavating pipes 9, themselves encircled by the support-surface 4. The shaft 15 passing through the slash opened between the pipes 9, joins the mooring organ's head 2 to the supportsurface 4. The tubes' unit 9 can form one single and same tube, unfigured, of curved section, jacketing the mooring organ 2.

This excavating unit allows advantageously the use as structure, of inexpensive solid bars. It allows a great fixation surface.

The device and its excavating pipes 9 are connected by one or several tubes 10, to air or water sources supplied by generators which can be installed on a workboat 8. A pump delivering 150 water cubic meters per hour and 10 KWA, for example, can achieve adequate underwater pressure during the excavating operation. Also an air compressor, similar to one used by divers, with 30 cubic meters per hour delivery and 200 bars pressure, can achieve the excavating operation through sediments' repulsion. The devices and their excavating pipes are hanging on one or several cables 7 which are handled from the work-boat 8.

The structure burying depth, its position above the bottom 3 and in the water height, its profile, its section empty or full, the material it is made of, the fixation surface available to the cultivated organisms, are all changeable parameters depending the faced conditions such as sediment kind, water depth, cultures kind, cost prices and others.

If for example, it is a matter to cultivate and fix the giant algae Macrocystis pyrifera, in a 20 meter deep sea, and on a sandy bottom, a structure according to the invention may be buried 3 meters and more into the sediments, it may stand 50 centimeters and more above the sea floor at a height greater than the height the granules of water removed sand can reach. It may present at its top a fixation surface made of a 4 to 100 quare centimeters and more horizontal support-surface. The mooring organ can have a 10 millimeters and more diameter section.

For other applications, the mooring organ 2 can be supple as a rope or rigid as a bar or semi-rigid. It can be full or hollow, of a density superior or inferior to the water density. The support-surface 4 for cultivated organisms fixation which is an integral part of the structure 1, can have all shapes a cultivated specie could require. The support-surface can have a high buoyancy capacity, particularly if the mooring organ is supple. The length of the structure can be great which allows, particularly if it is a rope which has been coiled in the device before its setting, the culture of organisms placed at a high position in the water level.

The organisms fixation support-surface can be advantageously removable from the mooring organ in order to be separated and more easily handled during the fixing operations of cultivated organisms before the setting, as for example, the operations for natural collecting at sea or artificial fixation in basin.

Figure 5:
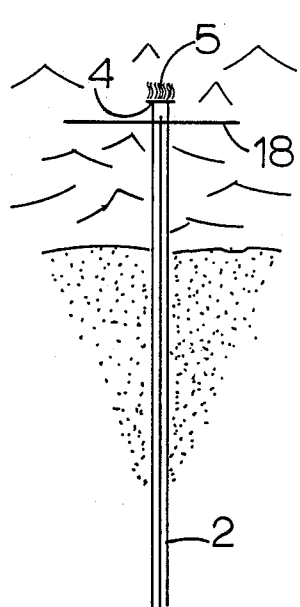
FIG. 5 shows a way of making a structure implanted in the sediments layer and acting on the sea floor as an algae artificial substrates
Figure 8:
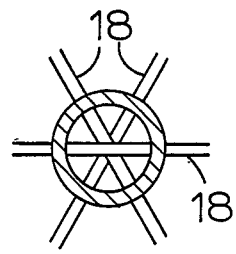
FIG. 8 shows the lower parts of both the structure in FIG. 5 and its setting device.

In FIG. 5, we see another way of achievment of a structure buried in the sediments layer. The mooring organ 2 includes and is extended by a rope 16 which allows a deeper mooring in the sediments layer. The structure is set as previously by means, FIG.8 , of an excavating pipe 9 bound at its lower part with an anti-extraction device 17 placed at the rope's end 16. The binding between the excavating pipe 9 and the anti-extraction device 17 being a temporary binding for the structure's setting into the sediments.

Figure 6:
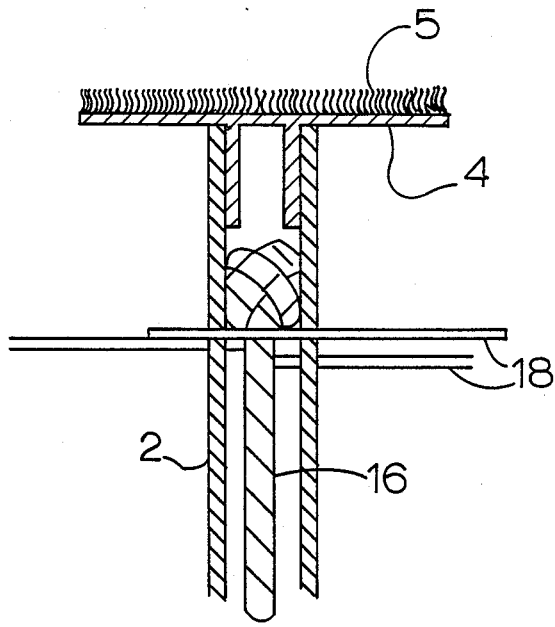
FIG. 6 shows in detail the upper part of the structure according to FIG. 5
Figure 7:
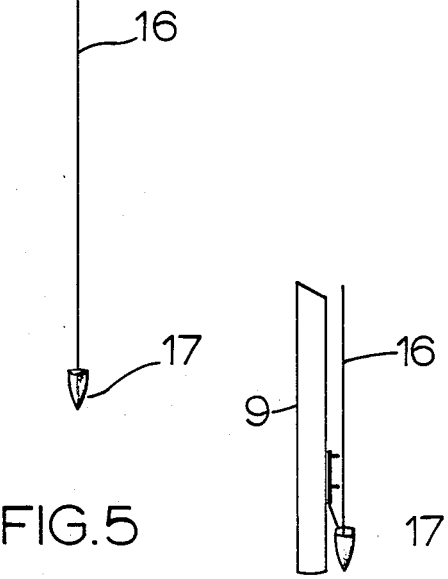
FIG. 7 shows a view from above of FIG. 6 without the algae support.

In FIG. 6 and 7, we see radial branches 18 placed under the support-surface on which algae 5 are fixed; these radial bars 18 are fixed at the upper tubelike part of the mooring organ 2 and they extend so that they constitute a support and supplementary fixing means for the algae allowing also for their stretching in width and not only in height. On FIG. 6, we see detail of the structure's head comprising the support-surface 4 on which are fixed the little algae 5 and the radial branches 18 placed under the support-surface 4, and which constitute at the same time a fixing means for the mooring rope 16.

As an achievment's example the mooring organ 2 is made of a 22 millimiters diameter, 1.5 meter long, polyethylene tube protruding by 50 centimeters above the sea floor 3. Inside the polyethylene tube a, 7 millimeters diameter, 3 meter long, polypropylen rope 16 is buried into the sediments further beyond the tube's end. At the foot of the rope 16 we see a funnel-shaped anti-extraction device 17. Structure 1 bears at its top a fixation support-surface of young algae 5 and under, three 35 centimeters long polyester fiberglass bars 18.

The invention is applicable to numerous vegetal and animal aquatic cultures which for their fixation need a strong, durable and inexpensive artificial substrate.

Among the invention's applications, we may quote the application which allows the transformation of an unstable sea bottom made of light sediments, in a stable and hard sea bottom made of agglomerated shellfishes. For this, the supple or semi-rigid structures, according to the invention, are sowed with agglomerating shellfishes as portuguese oysters. Under the weight of shellfishes growing in an agglomerated mass, the structures bend and sink down to the bottom, each one making up a little oyster rock builds up an agglomerated shellfish solid reef which ends stretching in a continuous surface on the sea floor where was previously an unstable bottom made of light sediments.

I claim:

1. A method for implantation of an artificial substrate into a sedimentary water bottom comprising the steps of
    attaching a first end of a long flexible mooring element to an artificial substrate unit;
    positioning an excavating pipe adjacent the long flexible mooring element and substrate unit;
    detachably connecting a second end of the long flexible mooring element to a lower end of the excavating pipe;
    lowering the excavating pipe with the mooring element and substrate unit connected thereto into the sedimentary water bottom while forcing fluid through the pipe and out the lower end;
    discontinuing the forcing of fluid through the pipe and stopping the lowering of the excavating pipe with the mooring element when the artificial substrate unit is positioned at a predetermined level above the sedimentary water bottom;
    detaching the mooring element from the excavating pipe; and
    raising the pipe out from the sedimentary water bottom allowing sediment to encompass and secure the long flexible mooring element.

2. The method of implantation according to claim 1 further comprising connecting an anti-extraction device to the second end of the long flexible mooring element.

3. The method of implantation according to claim 2 wherein the long flexible mooring element is bare.

4. The method of implantation according to claim 1 wherein the long flexible mooring element is bare.

5. The method of implantation according to claim 2 wherein the mooring element is positioned inside the excavating pipe during lowering.

6. A method for implantation of an artificial substrate into a sedimentary water bottom comprising the steps of
    attaching a first end of a long flexible mooring element to an artificial substrate unit;
    positioning a plurality of excavating pipes around the long flexible mooring element and substrate unit;
    detachably connecting a second end of the long flexible mooring element to a lower end of one of the excavating pipes;
    lowering the excavating pipes with the mooring element and substrate unit connected thereto into the sedimentary water bottom while forcing fluid through the pipes and out the lower ends;
    stopping the lowering of the excavating pipes with the mooring element when the artificial substrate unit is positioned at a predetermined level above the sedimentary water bottom and discontinuing the forcing of fluid through the pipes;
    detaching the mooring element from the excavating pipes; and
    raising the pipes out from the sedimentary water bottom allowing sediment to encompass and secure the long flexible mooring element.

7. The method of implantation according to claim 6 further comprising connecting an anti-extraction element to the second end of the long flexible mooring element.

8. The method of implantation according to claim 7 wherein the long flexible mooring element is bare.

9. A device for mooring an artificial substrate unit to a sedimentary water bottom comprising
    a long flexible connecting element having a bare first end connectable to an artificial substrate unit and a second end for implantation into a sedimentary water bottom.

10. The device according to claim 9 further comprising an anti-extraction element connected to the second end of the long flexible mooring element.

11. The mooring device according to claim 9 wherein the second end includes a connector piece for detachable connection to an excavating pipe.

* * * * *